Dec. 7, 1926.
C. F. SPEIDEL
1,610,175
VIEW FINDER FOR PHOTOGRAPHIC CAMERAS
Filed June 5, 1924
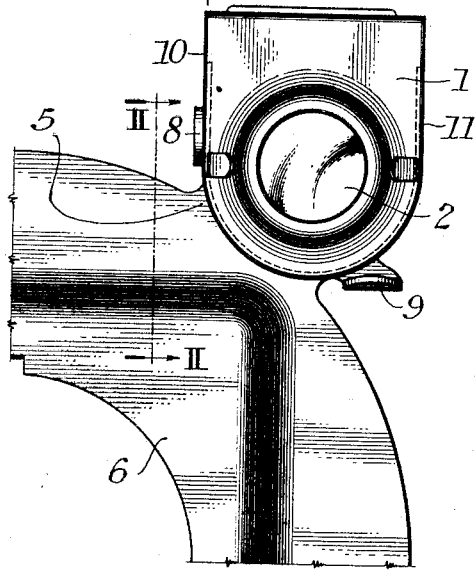
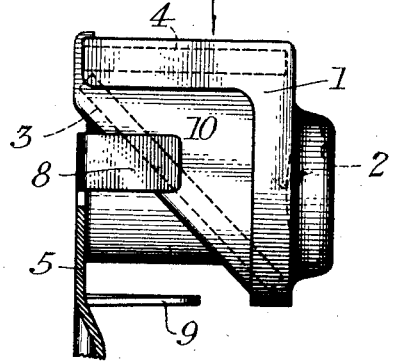
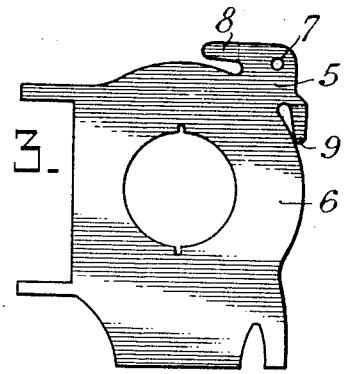
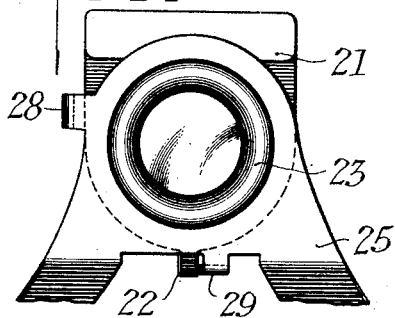
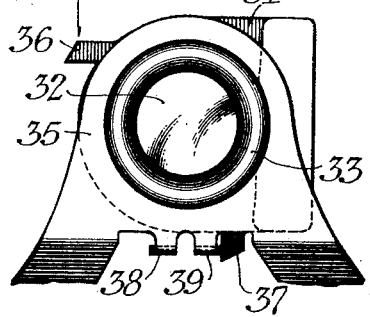
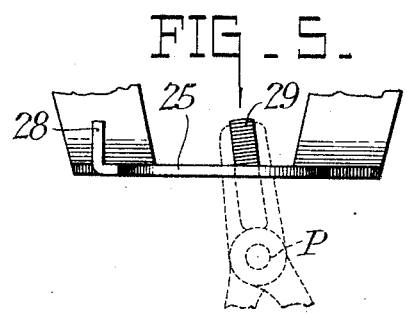
INVENTOR,
Charles F. Speidel,
BY
ATTORNEYS.

Patented Dec. 7, 1926.

1,610,175

UNITED STATES PATENT OFFICE.

CHARLES F. SPEIDEL, OF ROCHESTER, NEW YORK, ASSIGNOR TO EASTMAN KODAK COMPANY, OF ROCHESTER, NEW YORK, A CORPORATION OF NEW YORK.

VIEW FINDER FOR PHOTOGRAPHIC CAMERAS.

Application filed June 5, 1924. Serial No. 718,140.

My present invention relates to photography, and more particularly to view finders for cameras for the purpose of ascertaining the field of view which will be included in the completed picture. One object of my invention is to provide a cheap and efficient means for mounting the finder on the support. Another object is to provide such a mount upon which the finder box may be turned so as to be available for horizontal and vertical views. Another object is to provide suitable stops to locate the finder for horizontal and vertical views, and particularly to provide adjustments by which the location of the finder can be accurately and quickly obtained. Still another object is to provide an adjustment which can be made without difficulty after the finder is assembled. To these and other ends the invention resides in certain improvements and combinations of parts, all as will be hereinafter fully described, the novel features being pointed out in the claims at the end of the specification.

In the drawings, wherein like reference characters denote like parts throughout:

Fig. 1 is a front elevation of a finder, constructed in accordance with and illustrating one embodiment of my invention;

Fig. 2 is a section on line II—II of Fig. 1 showing the finder in elevation;

Fig. 3 is a plan view of a blank from which the lens board and finder support may be made;

Fig. 4 illustrates a front elevation of another embodiment of my invention;

Fig. 5 is a plan view of the support used with the finder shown in Fig. 4; and

Fig. 6 is a third embodiment of my invention, showing a front elevation of a finder.

Broadly my invention comprises mounting a finder box upon a support so that it may be turned between two locating stops which may be bent in assembling the camera to properly position the finder box for registering vertical and horizontal views in a preliminary adjustment.

In Fig. 1 the finder box 1 carries the usual lens 2, mirror 3 and viewing lens or ground glass 4. This box may be of any preferred type, and is here shown as mounted upon a support 5 which is part of the camera lens board 6. The box 1 may be carried by a single stud passing through aperture 7 so that it may be turned for registering horizontal and vertical views.

In order to provide locating pins or stops to position the finder box, as shown in Fig. 3, I prefer to cut lugs 8 and 9 from portions of the support 5, and bend these members at an angle, preferably at substantially a right angle to the support so as to project into the path of the finder box. Stop 8 by striking side 10 of the finder positions it for vertical views, and stop 9 by striking side 11 of finder box 1 positions the finder for vertical views. These members 8 and 9 are initially bent to the correct position for a normal finder, but owing to manufacturing difficulties lens 2, mirror 3 or the viewing lens or ground glass 4 may lie slightly out of their intended plane, or in other words may, when assembled be decentered and thus register an incorrect field of view for horizontal or vertical views, or sometimes for both. In such cases the positioning lug 8 or 9 may be bent with a suitable instrument such as pliers P until the correct position is obtained. This adjustment can be rapidly made without disassembling the finder. As the metal is of substantial thickness, the lugs retain the set given them.

In Fig. 4 the finder box 21 is equipped with a lug 22, which may strike either of two lugs 28 and 29 carried by support 25, the finder box being revolubly supported by the front lens tube 23 in a well known manner. Here, as shown in Fig. 5, lugs 28 and 29 may be bent for adjustment, or, if the finder registers out of alignment for both horizontal and vertical views in the same direction lug 22 on the finder may alone be bent.

In Fig. 6 the support 35 carries the finder box 31, which is movable upon the lens tube 33 which holds the front lens 32. Lugs 36 and 37 are carried by the finder box 31 to contact with lugs 38 and 39 of support 35. All of these four lugs may be bent for adjustment although it is generally preferable to bend lugs 36 and 37 or 38 and 39 in pairs as this simplifies the adjusting operation.

In the embodiments above described there is, in each instance a bendable lug which can be used for the initial adjustment of the finder, and this lug is located so that an operator may make the adjustment upon the assembled camera from the front. It is obvious that the embodiments described by way of illustration only, and I contemplate as within the scope of my invention all such forms as may come within the scope of the appended claims.

Having thus described my invention, what I claim as new and desire to secure by Letters Patent is:

1. In a view finder, the combination with a support, of a finder box mounted to turn upon the support, a lug extending angularly from the plane of the support into the path of the finder, said lug having an elongated body portion adapted to form a stop for the finder and adapted to be bent to adjust the position of the finder.

2. In a view finder, the combination with a support, of a finder box mounted to turn upon the support, and carried on one side of the support, a lug extending from the plane of the support on the same side as the finder box, and adapted to be adjusted for locating the finder box after the finder box has been assembled on the support.

3. In a view finder, the combination with a support, of a finder box pivoted thereon to one side of the support, lugs extending from the plane of the support on the same side as the finder and extending into the path of the finder, said lugs having a length greater than their width and adapted to be bent to adjust the position of the finder box, whereby the relation of the finder box and support may be altered after the view finder is assembled on the support.

4. In a view finder, the combination with a support, of integral lugs having greater width than the thickness of the support, said lugs extending from the plane of the support to one side thereof, a finder box pivoted to the support and adapted to turn thereon, the lugs lying in the path of the finder box and being adapted to be angularly adjusted by bending across the width of the lugs to initially adjust the location of the finder box when turned to lie against the lugs.

Signed at Rochester, New York, this 2nd day of June 1924.

CHAS. F. SPEIDEL.